Jan. 29, 1963    E. A. SWIRE    3,075,369
MOUNTING STRUCTURE
Filed April 4, 1961
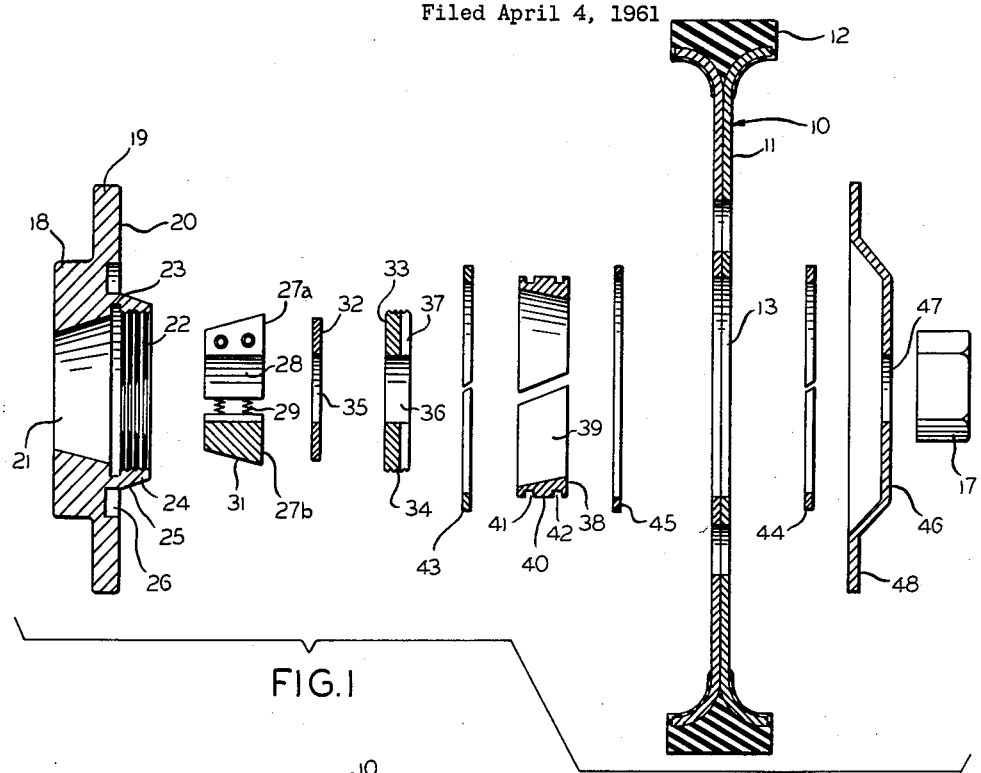
FIG.1
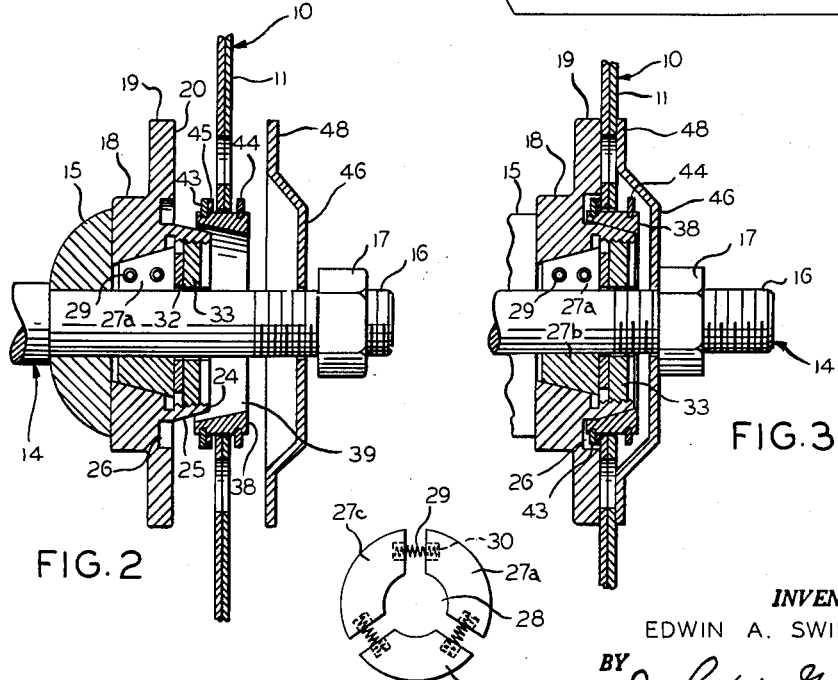
FIG.2
FIG.3
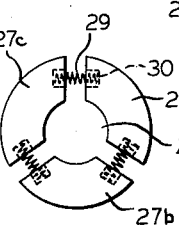
FIG. 4
INVENTOR.
EDWIN A. SWIRE
BY John W. Graham
ATTORNEY United States Patent Office 3,075,369
Patented Jan. 29, 1963

3,075,369
MOUNTING STRUCTURE
Edwin A. Swire, 454 Ridgeland Ave., Elmhurst, Ill.
Filed Apr. 4, 1961, Ser. No. 100,749
20 Claims. (Cl. 64—30)

This invention relates to apparatus for mounting a rotatable work implement upon a rotatable shaft so as to be driven thereby, and more particularly to mounting apparatus for effectively centering a rotatable work element in coaxial relation with the axis of rotation of a cylindrical drive shaft. The apparatus has utility, for example, in so mounting rigid and expandable abrasive wheels, contact wheels, etc.

In the use of rotatable work implements such as contact wheels, abrasive wheels and the like, a problem has always existed of perfectly centering such work implement upon a cylindrical drive shaft so that the work surface of the implement describes a path concentric to and coaxial with the rotational axis of the shaft. Primarily, the problem arises for at least two reasons: First, the drive shaft and/or the arbor hole of the work implement may not have dimensional exactness because of permissible manufacturing tolerances in the fabrication thereof (and the arbor hole must be slightly larger in any event to permit the shaft to pass therethrough); and secondly, after some period of use during which time a variety of work impletments are interchangeably mounted upon the shaft, the shaft becomes worn with a consequent decrease in its dimension and can no longer center even a work implement having a perfectly round arbor hole of appropriate size. It will be appreciated that improper centering of a rotatable work implement is a problem of importance because it destroys the dynamic balance thereof resulting in bumpiness and irratic operation, causes the same to wear excessively and unevenly since only the highest portions of the surface are used thereby shortening useful life, and results in generally poor performance adversely influencing the quality of the product conditioned or worked on thereby.

In view of this, an object of the invention is to provide mounting apparatus for conveniently and easily mounting a work implement upon a rotatable drive shaft in properly centered relation therewith. Another object of the invention is that of providing apparatus for mounting a rotatable work implement upon a cylindrical drive shaft so as to be rotatably driven thereby and which is effective to automatically center the work implement so that the axes of rotation of the shaft and work implement are coincident and any selected point on the work implement describes a path concentric to such coincident axis of rotation.

Still another object is in the provision of mounting apparatus which is effective to center a work implement upon a drive shaft as heretofore described, and which is also effective to operatively relate the shaft and work member for a driving relation therebetween—the driving and centering functions being separate in the sense that the driving engagement is not effected through the centering components. A further object is to provide mounting apparatus of the character described, in which certain of the driving and centering components thereof may be considered permanently related to the shaft and other components related to the work implement so that a plurality of work implements may be used interchangeably on the drive shaft and have the advantages of the mounting apparatus.

Still a further object is in the provision of mounting apparatus having the characteristics described, and in which a single operation is effective to both center the work implement relative to the drive shaft and to effect the driving interconnection therebetween. Additional objects and advantages of the invention will become apparent as the specification develops.

An embodiment of the invention is illustrated in the accompanying drawing, in which—

FIGURE 1 is an exploded view sectionally illustrating a typical work implement and components of the mounting apparatus in spaced apart relation and in the order of their location when assembled; FIGURE 2 is a broken vertical sectional view showing the apparatus and work implement in association with a rotatably driven shaft prior to the work implement being centered and drivingly related to the shaft; FIGURE 3 is a broken vertical sectional view similar to that of FIGURE 2, but illustrating the work implement in its fully mounted position; and FIGURE 4 is a front view in elevation of the collet component of the mounting apparatus.

The mounting apparatus is adapted to be used in association with a work implement 10 adapted to be rotatably driven, and the work implement may have a variety of specific forms and, for example, may be a contact wheel (as shown) which ordinarily will be used with a backstand and endless abrasive belt for performing abrading operations. Thus, the work implement 10 being a contact wheel in the specific form shown has a central hub or flange 11 that is relatively rigid and a rim 12 secured thereto. The rim 12 is preferably formed of a somewhat yieldable material such as a comparatively hard rubber, and the hub 11 is rigid, and usually will be formed of metal. The hub has a large central opening 13 therethrough, and at least one end preferably both of the faces of the hub 11 are finished so that they defined planes which are normal to the axis of rotation of the work implement. Customarily, the work implement will also be statically and dynamically balanced.

The mounting apparatus is also adapted to be used in association with a rotatably driven cylindrical shaft 14 which customarily will be connected either directly or through suitable gearing to an electric motor or other prime mover. The shaft 14 intermediate the ends thereof is equipped with a stop or back-up plate 15 that may have various specific forms but which is either directly or indirectly constrained upon the shaft so as to be rotatable therewith and cannot be moved longitudinally therealong at least toward the left as viewed in FIGURES 2 and 3. The outer free end of the shaft 14 is threaded, as shown at 16, and is adapted to receive a nut 17 thereon. Thus, the stop 15 and nut 17 are used to constrain various work implements therebetween so as to be rotatably driven by the shaft.

The mounting apparatus comprises a shaft adapter which includes a driver or face plate 18 having a radially and outwardly extending flange 19 defining a finished face 20—the plane defined thereby being normal to the axis of rotation of the driver 18. The driver is provided with an enlarged bore 21 extending longitudinally therethrough which is tapered and defines a frusto-conical configuration. The tapered bore 21 enlarges toward the face 20, and terminates in a threaded cylindrical section 22. The mergence of the tapered bore 21 and threaded section 22 may define a radially enlarged channel 23. Circumjacent the cylindrical threaded bore section 22 is a mounting flange 24 which is longitudinally disposed and is provided with a tapered frusto-conical mounting surface 25 that tapers inwardly from the face 20 toward the bore. Coaxial with the mounting flange 24 at the inner end thereof and cut in the face 20 of the radial flange 19 is an annular recess or channel 26, the function of which will be described hereinafter.

Adapted to be mounted within the tapered bore 21 is a collet structure defined in the specific illustration by three substantially identical segments 27a, 27b and 27c oriented so as to define a centrally disposed cylindrical bore or passage 28 therethrough. The collet segments are respectively separated from each other by a plurality of helical springs 29 that respectively seat within recesses 30 provided therefor in the various collet segments. The springs 29 resiliently bias the collet segments outwardly or away from each other (as seen in FIGURE 4) to permit such segments, and more particularly the adjacent faces thereof, to be moved toward each other which is effective to reduce the diameter of the passage 28. The outer surface of each collet segment is tapered as shown at 31, and such taper is complementary with that of the tapered bore 21 whereupon the collet structure can be urged into the tapered bore (as shown in FIGURES 2 and 3); thereby centering the driver 18 relative to the rotational axis of the shaft. The drive plate 18 may have the surfaces 20, 21 and 25 machined in a single chucking to insure that the surface 20 is at precisely 90° relative to the rotational axis of the plate.

The collet structure described and illustrated exemplifies various analogous and equivalent structural compositions which may be used to center the driver upon the shaft; and considering the specific structure, the various segments 27a through 27c can be separated by blocks of compressible or resilient material such as by rubber, by leaf springs, etc., as well as by the coil springs shown. The collet is displaced into the tapered bore 21 and into engagement with the surface of the shaft 14 by fastener structure having components thereof which engage both the collet and driver 18. Specifically, such fastener structure includes a washer 32 adapted to abut the outer surface of each of the collet segments, and a nut 33 adapted to abut the washer 32 and having a threaded surface 34 adapted to engage the threads 22 of the driver flange 24. It will be appreciated that both the washer 32 and nut 33 are respectively provided with central openings 35 and 36 therethrough to permit the same to be mounted circumjacent the shaft 14. The nut 33 has a plurality of recesses 37 in the outer face thereof to permit the nut to be gripped by the fingers to rotate the nut relative to the driver 18 to displace the collet structure into the tapered bore 21 and also to remove the nut when this is desired. Preferably, the nut 33 is not wrench-tightened because it is not intended that the drive plate 18 be locked on the shaft through the collet structure but only concentrically centered thereon by the collet structure—the mounting plate being rotatably driven by the element 15.

A mounting element in the form of a split ring 38 having a tapered passage 39 therethrough is employed in centering and mounting the work implement 10 upon the tapered flange 24 of the driver 18. Thus, the passage 39 has a taper that corresponds to the tapered configuration of the flange 24, and the split character of the mounting element permits the outer diameter thereof to be reduced to the extent necessary to permit the same to be inserted into the central opening 13 in the work implement 10, as shown best in FIGURE 2. The outer cylindrical surface 40 of the mounting element 38 is provided with a pair of spaced apart annular channels 41 and 42 which respectively receive stop elements 43 and 44 therein. Each of the stop elements is in the form of a split ring to permit the same to be expanded radially in mounting the same within the channels 41 and 42 therefor but either of the rings, 43 for example, could be integral with the mounting element. Thus, in the assembly, the work implement 10 is located between the stop elements 43 and 44 and can be displaced relative to the mounting element 38 within the axial limits defined by the stop elements.

A compressible member 45 which may be a wire spring or rubber ring or washer, as shown, is disposed between the stop element 43 and adjacent face of the work implement 10, as shown in FIGURES 2 and 3. This resilient washer is adapted to be compressed slightly, as will be described in greater particularity hereinafter, when the mounting element 38 and work implement 10 are positioned upon the tapered surface 25 of the longitudinally extending driver flange 24. Also operative in such mounting operation is locking structure comprising a dish-shaped washer or disc 46 having a central opening 47 therethrough adapted to receive the shaft 14 therein, and having also a laterally extending flange 48 adapted to engage the outer face of the work implement 10 outwardly of the enlarged central opening 13 therethrough. The disc 46 is forced into engagement with the work implement 10 by the nut 17 having external threads for engagement with the threaded end portion 16 of the shaft 14.

In use of the mounting structure, the driver 18 is mounted upon the shaft 14 in engagement with the stop 15 thereof (as shown in FIGURE 2) and the collet structure is inserted into the tapered bore 21, the washer 32 disposed in engagement with the collet structure, and the nut 33 screwed into the threaded section 22 of the bore. As the nut 33 is tightened relative to the driver 18, the collet structure is displaced longitudinally toward the left as viewed in FIGURE 2, and because of the complementary tapers of the bore and collet structure, the latter is progressively compressed about the shaft 14 and is urged into engagement therewith. At the same time, and as a consequence of the collet structure being properly centered relative to the rotational axis of the shaft 14, the driver 18 is simultaneously centered with respect to such axis. The cylindrical shaft 14 has now been effectively converted into a tapered shaft and, if desired, the driver, collet and nut assembly may be considered a permanent fixture or part of the shaft.

The mounting element 38 and associated rings 43, 44 and 45 are assembled with the work implement 10, and this is accomplished by compressing the mounting element 38 to permit the same to be inserted into the enlarged central opening 13 in the work implement, and by expanding the split stop elements 43 and 44 to permit the same to be inserted into the respectively associated channels 41 and 42. The ring 45, if formed of rubber or similar material, is simply stretched over the mounting element 38. If desired, the mounting element and associated components may be considered to be at least a semi-permanent part of the work implement 10; and thus, if a variety of work implements are so equipped, they may be interchangeably mounted upon the shaft adapter or, more specifically, upon the driver 18 thereof.

The next step is to position the assembled work implement about the shaft 14 with the tapered mounting element 38 positioned upon the tapered mounting surface 25 of the driver flange 24, as shown in FIGURE 2. The locking disc 46 and nut 17 are located upon the shaft, also as shown in FIGURE 2; and as the nut is tightened, the flange 48 of the disc 46 is brought into engagement with the outer surface of the work implement 10, and both the work implement and mounting element 38 are then displaced toward the left because of the resilient frictional forces developed between the split ring mounting element 38 and marginal surface of the work implement defining the central opening 13 therethrough. Such displacement continues until the surface of the tapered passage 39 tightly engages the tapered surface 25 of the mounting flange 24, for at this time the mounting element 38 and work implement 10 are properly centered with respect to the mounting flange 24 and, consequently, with respect to the rotational axis of the shaft 14; and the frictional force developed between the contiguous tapered surfaces 25—39 exceeds the frictional force exerted between the cylindrical surfaces 40—13 respectively provided by the mounting element and work implement. Therefore, as the nut 17 is further tightened, the work implement 10 is displaced toward the left and into engagement with the compressible washer 45, which washer is progressively compressed until the inner face of the work implement 10 abuts the face 20 of the driver 18. At this moment, the work implement is tightly clamped between the driver face 20 and flange 48 of the disc 46, and therefore the work implement is in tight frictional engagement with the driver face 20 and is adapted to be rotatably driven thereby.

Thus, the single operation of tightening the nut 17 against the disc 46 performs two functions: First, it automatically effects a centering of the work implement relative to the rotational axis of the shaft 14; and secondly, it clamps the work implement against the driver face 20 so that the work implement is rotatably driven by the shaft 14 through the driver and face 20 thereof, rather than through the mounting element 38. Since the face 20 of the driver has been carefully finished so that the plane thereof is normal to the rotational axis of the shaft 14 when the driver is properly mounted thereon, and since the face of the work implement 10 is correspondingly finished, the work implement is also located normal to the rotational axis of the shaft and because of the proper centering thereof, the rotational axis of the work implement is coincident with that of the shaft, and the outer cylindrical surface of the work implement 10 describes a circle having its center at the rotational axis of the shaft when the shaft 14 is rotated.

It will be apparent that the annular channel or recess 26 in the face 20 of the driver is of importance in the specific configuration because it receives therein the inner end portion of the mounting element 38 and stop element 43, as shown in FIGURE 3, thereby permitting the washer 45 to be compressed and the surface of the work implement 10 to be brought into clamping engagement with the face 20 of the driver, and the various associated components are dimensionally related to provide this disposition thereof. There is little occasion for the mating mounting surfaces to become worn since such surfaces are used for properly locating and mounting the work implement relative to the rotational axis of the shaft 14, and are not employed for rotatably driving the work implement. Thus, the structure does not suffer the disadvantages inherent in conventional arrangements, and any surface wearing that may occur through extensive use as between the surfaces 25—39 and 21—31 is automatically accommodated by the tapered configuration thereof.

It has been stated heretofore that the inner face of the work implement 10 is finished so as to mate perfectly with the machined face 20 of the drive plate 18, but it has been found that the result of accurately mounting the work implement so that the cylindrical surface thereof is coaxial with the rotational axis of the shaft may be obtained without machining or otherwise carefully finishing the inner face of the work implement if a relatively thin deformable material is placed along such inner face as, for example, a label formed of blotter-type paper. It will be apparent that in mounting the work implement and split ring 38 upon the tapered flange 24 of the driver plate, the split ring 38 may expand slightly as it moves onto the tapered surface 25 and into tight engagement with the perimetric edge of the opening 13 through the work implement. This arrangement reduces the manufacturing cost involved in making the mounting element 38, and it will be apparent that the element 38 could be a continuous ring with both the tapered bore 39 and outersurface 40 thereof being carefully machined to dimensional accuracy. If in any installation the stop 15 is slidable along the shaft 14, it will be forced into tight frictional engagement with the shoulder on the shaft as the nut 17 is tightened; and thus, the work implement 10 will be rotatably driven through the face 20 of the driver plate 18 and the stop or back-up plate 15.

While in the foregoing specification an embodiment of the invention has been set forth in considerable detail for purposes of making an adequate disclosure thereof, it will be apparent to those skilled in the art that numerous changes may be made in such details without departing from the spirit and principles of the invention.

I claim:

1. In apparatus for mounting a work implement upon a rotatable shaft so as to be rotatably driven thereby with any selected point on the work implement describing a circular path closely approximating a condition of perfect concentricity and coaxiality relative to the rotational axis of such shaft, a shaft adapter for effectively converting such shaft to a tapered shaft and including a driver having a tapered bore adapted to receive such shaft therein and having also a face defining a plane substantially normal to the rotational axis of such shaft when said driver is properly positioned thereon, said driver being equipped with a mounting flange extending axially outwardly therefrom in coaxial relation with said bore and tapering inwardly from said face toward such axis of rotation, a segmented collet structure adapted to be mounted upon such shaft and being receivable within said tapered bore for centering said driver upon such shaft in coaxial relation with the rotational axis thereof, fastener structure having components thereof interconnectably engageable with said driver and collet structure to force the latter into said tapered bore and into frictional engagement with the walls thereof and with such shaft to effect such centering of said driver, a mounting element having an opening therethrough tapered in complementary relation with said mounting flange for receipt thereon and being adapted to receive and support such work implement thereon in coaxial relation therewith and so as to permit relative movements therebetween along such rotational axis, stop structure carried by said mounting element to limit movement of such work implement in one axial direction relative to said mounting element, and locking structure adapted to be mounted upon such shaft in engagement with such work implement and being interconnectably operative therebetween to displace said mounting element into tight frictional engagement with said mounting flange and thereby coaxially center said mounting element relative to the axis of rotation of such shaft and to displace such work implement into tight frictional engagement with the face of said driver so that the work implement is rotatably driven thereby.

2. In apparatus for mounting a work implement upon a rotatable shaft so as to be rotatably driven thereby with any selected point on the work implement describing a circular path closely approximating a condition of perfect concentricity and coaxiality relative to the rotational axis of such shaft, a shaft adapter for effectively converting such shaft to a tapered shaft and including a driver having a tapered bore adapted to receive such shaft therein and having also a face defining a plane substantially normal to the rotational axis of such shaft when said driver is properly positioned thereon, said driver being equipped with a mounting flange extending axially outwardly therefrom in coaxial relation with said bore and tapering inwardly from said face toward such axis of rotation, centering structure adapted to be mounted upon such shaft and being receivable within said tapered bore for centering said driver upon said shaft in coaxial relation with the rotational axis thereof, fastener structure having components thereof interconnectably engageable with said driver and centering structure to force the latter into said tapered bore and into frictional engagement with the walls thereof and with such shaft to effect such centering of said driver, a mounting element having an opening therethrough tapered in complementary relation with said mounting flange for receipt thereon and being adapted to receive and support such work implement thereon in coaxial relation therewith and so as to permit relative movements therebetween along such rotational axis, stop structure carried by said mounting element to limit movement of such work implement in one axial direction relative to said mounting element, and locking structure adapted to be mounted upon such shaft in engagement with such work implement and being interconnectably operative therebetween to displace said mounting element into tight frictional engagement with said mounting flange and thereby coaxially center said mounting element relative to the axis of rotation of such shaft and to displace such work implement into tight frictional engagement with the face of said driver so that the work implement is rotatably driven thereby.

3. The apparatus of claim 2 in which said mounting element comprises a split ring adapted to be removably mounted within an opening provided therefor by such work implement.

4. The apparatus of claim 2 in which said mounting element is provided with an annular recess about the surface thereof adjacent such work implement, and in which said stop structure comprises a split ring removably mounted within said annular recess.

5. The apparatus of claim 2 in which a second stop structure is carried by said mounting element in spaced relation with the aforesaid stop structure so that movement of such work implement relative to said mounting element is limited in both axial directions.

6. The apparatus of claim 2 in which said fastener structure comprises an externally threaded nut engageable with said centering structure, and in which said driver is equipped with threads for engaging said nut in effecting the aforesaid displacement of said centering structure into said tapered bore to center said driver.

7. In apparatus for mounting a work implement upon a rotatable shaft so as to be rotatably driven thereby with any selected point on the work implement describing a circular path closely approximating a condition of perfect concentricity and coaxiality relative to the rotational axis of such shaft, a shaft adapter for effectively converting such shaft to a tapered shaft and including a driver having a tapered bore adapted to receive such shaft therein and having also a face defining a plane substantially normal to the rotational axis of such shaft when said driver is properly positioned thereon, said driver being equipped with a mounting flange extending axially outwardly therefrom in coaxial relation with said bore and tapering inwardly from said face toward such axis of rotation, centering structure adapted to be mounted upon such shaft and being receivable within said tapered bore for centering said driver upon said shaft in coaxial relation with the rotational axis thereof, fastener structure having components thereof inter-connectably engageable with said driver and centering structure to force the latter into said tapered bore and into frictional engagement with the walls thereof and with such shaft to effect such centering of said driver, a mounting element having an opening therethrough tapered in complementary relation with said mounting flange for receipt thereon and being adapted to receive and support such work implement thereon in coaxial relation therewith and so as to permit relative movements therebetween along such rotational axis, and locking structure adapted to be mounted upon such shaft in engagement with such work implement and being interconnectably operative therebetween to displace said mounting element into tight frictional engagement with said mounting flange and thereby coaxially center said mounting element relative to the axis of rotation of such shaft and to displace such work implement into tight frictional engagement with the face of said driver so that work implement is rotatably driven thereby.

8. In combination with a shaft adapted to be rotatably driven, a shaft adapter coaxially supported upon said shaft for effectively converting the same to a tapered shaft and having a face defining a plane substantially normal to the rotational axis of said shaft and a mounting flange extending axially outwardly from said face and tapering inwardly toward the rotational axis of said shaft, a mounting element having an opening therethrough tapered in complementary relation with said mounting flange and being received thereon, a work implement positioned upon said mounting element in coaxial relation therewith and being movable relative thereto along the rotational axis of said shaft, and locking structure in engagement with said work implement and shaft and being operative to displace said mounting element along said mounting flange and thereby coaxially center said mounting element and work implement relative to the axis of rotation of said shaft whereby any selected point on said work implement describes a circular path closely approximating a condition of perfect concentricity and coaxiality relative to the rotational axis of said shaft, said locking structure also being operative to displace said work implement relative to said mounting flange into tight frictional engagement with the face of said driver so that said work implement is rotatably driven thereby.

9. In combination with a shaft adapted to be rotatably driven, a shaft adapter coaxially supported upon said shaft for effectively converting the same to a tapered shaft and having a face defining a plane substantially normal to the rotational axis of said shaft and a mounting flange extending axially outwardly from said face and tapering inwardly therefrom toward the rotational axis of said shaft, said face being provided with an annular channel therein circumjacent said mounting flange, a mounting element having an opening therethrough tapered in complementary relation with said mounting flange and being received thereon, a work implement positioned upon said mounting element in coaxial relation therewith and being movable relative thereto along the rotational axis of said shaft, stop structure carried by said mounting element to limit movement of said work implement relative to said mounting element in the axial direction toward said face and being positioned within said channel as a consequence of such movement of said work implement toward said face, and locking structure in engagement with said work implement and shaft and clamping said work implement in tight frictional engagement with the face of said driver so that the work implement is rotatably driven thereby, said locking structure also being operative to displace said mounting element into seating engagement with said mounting flange and thereby coaxially center said mounting element and work implement relative to the axis of rotation of said shaft whereby any selected point on said work implement describes a circular path closely approximating a condition of perfect concentricity and coaxiality relative to the rotational axis of said shaft.

10. The combination of claim 9 in which a compressible element is interposed between said stop structure and work implement.

11. The combination of claim 9 in which said mounting element comprises a split ring positioned within an opening provided therefor by said work implement and being in frictional engagement with the edges of said work implement defining said opening.

12. The combination of claim 9 in which said mounting element is provided with an annular recess adjacent said work implement, and in which said stop structure comprises a ring removably received within said annular recess.

13. The combination of claim 9 in which a second stop structure is carried by said mounting element in spaced relation with the aforesaid stop structure so that movement of said work implement relative to said mounting element is limited in both axial directions.

14. In combination with a rotatable work implement having a relatively rigid hub provided with a centrally disposed opening therethrough having its center on the rotational axis of said work implement, a mounting element having a substantially cylindrical outer surface and a tapered passage extending axially therethrough, said mounting element being received within said opening in frictional engagement with the marginal edges thereof but being axially movable relative to said work implement, a pair of axially spaced stop structures carried by said mounting element along the cylindrical surface thereof and extending outwardly therefrom to limit relative movements between said mounting element and work implement in both axial directions, and a compressible member interposed between one of said stop structures and said work implement, said mounting element being adapted to be mounted upon a tapered flange provided by a shaft adapter centered upon a rotatably driven shaft and having a flange defining a face normal to the axis of rotation thereof provided with an annular channel for receiving said stop structure therein adjacent said compressible member to enable said work implement to be brought into tight frictional engagement with such face.

15. The combination of claim 14 in which said mounting element comprises a split ring.

16. The combination of claim 14 in which said mounting element is provided in the cylindrical surface thereof with a pair of axially spaced annular channels, and in which said stop structures are respectively mounted within said channels and are selectively removable therefrom.

17. The combination of claim 16 in which each of said stop structures comprises a split ring.

18. In combination with a rotatable shaft, apparatus for mounting a work implement thereon so as to be rotatably driven thereby with any selected point on such work implement describing a circular path closely approximating a condition of perfect concentricity and coaxiality relative to the rotational axis of said shaft, a shaft adapter for effectively converting said shaft to a tapered shaft and including a driver having an enlarged tapered bore passing said shaft therethrough and having also a laterally extending flange defining a face substantially normal to the rotational axis of said shaft, said driver being equipped with a mounting flange extending axially along said shaft in coaxial relation with said bore and tapering inwardly from said face toward said shaft, centering structure mounted upon said shaft in gripping engagement therewith and being located within said tapered bore in engagement therewith for centering said driver upon said shaft in coaxial relation with the rotational axis thereof, a mounting element having an opening therethrough tapered in complementary relation with said mounting flange and being received thereon, a work implement carried by said mounting element in coaxial relation therewith and being movable relative thereto along the axis of said shaft, and locking structure mounted upon said shaft in engagement with said work implement and being interconnectably operative therebetween to displace said mounting element into seating engagement with said mounting flange and thereby coaxially center said mounting element relative to the axis of rotation of said shaft and to displace said work implement into tight frictional engagement with the face of said driver so that said work implement is rotatably driven thereby.

19. The combination of claim 18 in which said face is provided with an annular channel therein circumjacent said mounting flange, and in which said mounting element is equipped with stop structure for limiting relative movement between said work implement and mounting element in the direction toward said face, said stop structure being located within said annular channel, and in which there is additionally provided a compressible member interposed between said stop structure and work implement.

20. In combination with a cylindrical shaft adapted to be rotatably driven, a shaft adapter mounted upon said shaft and having a mounting flange extending axially along the axis of said shaft and tapering inwardly theretoward for effectively converting said shaft to a tapered configuration, a mounting element having an opening therethrough tapered in complementary relation with said mounting flange and being received thereon, a work implement positioned upon said mounting element in coaxial relation therewith, and locking structure adjustably mounted upon said shaft for displacing said mounting element into seating engagement with said mounting flange to coaxially center said mounting element and work implement relative to the axis of rotation of said shaft whereby any selected point on said work implement describes a circular path closely approximating a condition of perfect concentricity and coaxiality relative to the rotational axis of said shaft.

References Cited in the file of this patent

UNITED STATES PATENTS

| | | |
|---|---|---|
| 2,465,471 | Packer | Mar. 29, 1949 |
| 2,574,773 | Bannister | Nov. 13, 1951 |
| 2,642,730 | Snyder | June 23, 1953 |
| 2,760,801 | O'Shei et al. | Aug. 28, 1956 |
| 2,885,230 | Terpin | May 5, 1959 |